(12) United States Patent
Plourde et al.

(10) Patent No.: US 6,523,975 B1
(45) Date of Patent: Feb. 25, 2003

(54) ADJUSTABLE SUPPORT AND METHOD OF MODIFYING A FLOURESCENT LIGHT FIXTURE

(76) Inventors: Jason V. Plourde, 504 Quail Lake Dr., DeBary, FL (US) 32713; Michael Brennan, 1612 White Dove Ct., Winter Springs, FL (US) 32708; Frederick W. Froelich, 1004 Monterey Dr., Leesburg, FL (US) 34749; Von A. Plourde, 1183 St. Albans Loop, Heathrow, FL (US) 32746

( * ) Notice: Subject to any disclaimer, the term of this patent is extended or adjusted under 35 U.S.C. 154(b) by 0 days.

(21) Appl. No.: 09/920,429

(22) Filed: Aug. 1, 2001

(51) Int. Cl.[7] .................................................. F21S 4/00
(52) U.S. Cl. ........................ 362/225; 362/217; 362/220; 362/429; 439/226; 439/234; 248/316.4
(58) Field of Search ................................ 362/225, 226, 362/362, 365, 366, 457, 217, 220, 429, 372; 439/226, 228, 234, 232; 248/316.1, 316.4, 316.6, 231.41, 228.3

(56) References Cited

U.S. PATENT DOCUMENTS

| 2,262,586 | A | * | 11/1941 | James ........................... 362/221 |
| 2,281,346 | A | * | 4/1942 | Biller ........................... 362/225 |
| 2,291,490 | A | * | 7/1942 | Naysmith .................... 362/221 |
| 4,129,900 | A | * | 12/1978 | Sanz ............................ 362/217 |
| 4,130,860 | A | * | 12/1978 | Careglio et al. ............. 362/217 |
| 4,420,798 | A | * | 12/1983 | Herst et al. .................. 362/147 |
| 6,007,217 | A | * | 12/1999 | Ferrier ......................... 362/220 |
| 6,059,424 | A | * | 5/2000 | Kotloff ......................... 362/220 |

OTHER PUBLICATIONS

Energy Planning Associates Corp. brochure, pp. 15, 16, and 28.

* cited by examiner

*Primary Examiner*—Alan Cariaso
*Assistant Examiner*—Sharon Payne
(74) *Attorney, Agent, or Firm*—Beusse, Brownlee, Bowdoin & Wolter, P.A.; David G. Maire

(57) ABSTRACT

An adjustable support member for attaching fluorescent lamps to a light strip fixture body. The adjustable support member is easily adjusted to accommodate fixture bodies having a variety of widths, thereby simplifying the upgrading of existing light fixtures to use more energy efficient bulbs. The support member includes a generally planar support body having a pair of channels formed thereon, and a pair of angle brackets which may be slid into the respective channels to a desired width. The angle brackets are held at a desired width by the ratchet/pawl effect of mating detents formed on the support body and the angle brackets. The channels are formed by stamping generally L-shaped channel members integral with the support body material. A reflector having a center ridge is formed to have a mounting tab by cutting a generally U-shaped opening along the center ridge. The mounting tab is then easily flattened for attachment to the support body for installing the reflector as part of the fixture upgrade.

17 Claims, 3 Drawing Sheets

ADJUSTABLE SUPPORT AND METHOD OF MODIFYING A FLOURESCENT LIGHT FIXTURE

This invention related generally to the field of lighting, and more particularly to modifying fluorescent light fixtures to use energy efficient bulbs, and in particular to an adjustable clip strip and method for supporting a reflector and energy efficient bulbs on an existing fluorescent light fixture body.

BACKGROUND OF THE INVENTION

The light produced by a fluorescent tube is generated by an electric current being conducted through mercury and inert gases. Fluorescent lighting is generally used in indoor applications for both ambient and task lighting. The two most common types of fluorescent lamps are 40-watt, 4-foot (1.2-meter) lamps and 75-watt, 8-foot (2.4-meter) lamps. Tubular fluorescent fixtures and lamps are preferred for ambient lighting in large indoor areas because their low brightness creates less direct glare than do incandescent bulbs, and because fluorescent lighting is about three to four times as energy efficient as incandescent lighting. Although fluorescent lamps are generally energy efficient, there are new more efficient lamps that use improved electrodes and coatings when compared to older fluorescent lamps. The new lamps produce about the same lumen output with substantially lower power consumption. Common 40-watt and 75-watt lamps can be replaced with energy-saving lamps of 34 watts and 60 watts, respectively. New more energy efficient ballasts are also available. These improved electromagnetic ballasts and electronic ballasts can improve the energy efficiency of the fixture by as much as thirty percent.

A large market exists for the upgrading of fluorescent lighting in industrial applications, such as warehouses and factories, to install modem energy efficient bulbs and ballasts. In addition, many older fluorescent light fixtures were installed without reflectors in order to provide a more diffused up-lighting effect. With today's concern for energy efficiency and cost reduction, it is often desirable to upgrade a fluorescent fixture to add a reflector and to replace the bulbs and ballasts with more energy efficient designs.

Unfortunately, not all existing fluorescent light fixtures are the same design. In particular, the width of the light strip fixture body may vary from about 4 inches to about 5.5 inches, with typical widths being 4 inches, 4.3 inches, 4.6 inches, 5 inches and 5.5 inches. Often times a single building will have a plurality of fixture sizes. Since these fixtures may be installed at a substantial height above the floor, it is often difficult to determine what fixture sizes will be encountered until the installer actually begins to disassemble the fixture as part of the upgrade process. At that time the installer if often on a ladder and may or may not have the proper size replacement parts with him/her for completing the upgrade.

SUMMARY OF THE INVENTION

Accordingly, an improved method and apparatus for upgrading fluorescent lighting fixtures is needed. Accordingly, a fluorescent lighting fixture is described herein as including: a fixture body having a width dimension; a support member attached to the fixture body, the support member comprising at least one sliding member for adapting the support member to have a range of width dimensions, the range of width dimensions of the support member encompassing the width dimension of the fixture body; and a fluorescent bulb supported from the support member. The fixture may further include: a support body member attached to the fixture body, the support body comprising a channel; and an angle bracket having a portion inserted into the channel and slidable therein. A locking mechanism may be provided for releasably securing the angle bracket in any of a plurality of predetermined positions in the channel. The fixture may further include: at least one detent formed on the angle bracket; at least one detent formed on the support body member; wherein the angle bracket may be releasably secured in any one of a plurality of predetermined positions in the channel by aligning at least one detent on the angle bracket with at least one detent on the support body member.

A support member for attaching a fluorescent bulb to a light fixture body is described herein as including: a support body having a pair of channels formed thereon; a pair of angle brackets, each angle bracket having a horizontal member slidably disposed within a respective one of the channels and having a vertical member; and a width between the respective vertical members being adjustable by sliding a respective horizontal member within a respective channel to accommodate any of a plurality of light fixture body widths. The support member may further include a releasable locking mechanism for securing the pair of angle brackets at any of a plurality of positions.

A method of upgrading a fluorescent light fixture is described herein as including the steps of: providing an existing fixture body having a width; providing a support member that is adjustable to interface with fixture bodies having a plurality of widths; adjusting the support member to interface with the width of the existing fixture body; attaching the support member to the fixture body; attaching a lamp holder to the support member; and connecting a replacement bulb to the lamp holder. The method may further include the steps of: providing a reflector having a center ridge and a generally concave shape; forming a mounting tab along the center ridge by cutting a generally U-shaped opening in the reflector; flattening the mounting tab; and attaching the mounting tab to the support member.

BRIEF DESCRIPTION OF THE DRAWINGS

FIG. 3 is a side view of one of the angle brackets of the clip strip of FIG. 2.

DETAILED DESCRIPTION OF THE INVENTION

Figure 1:
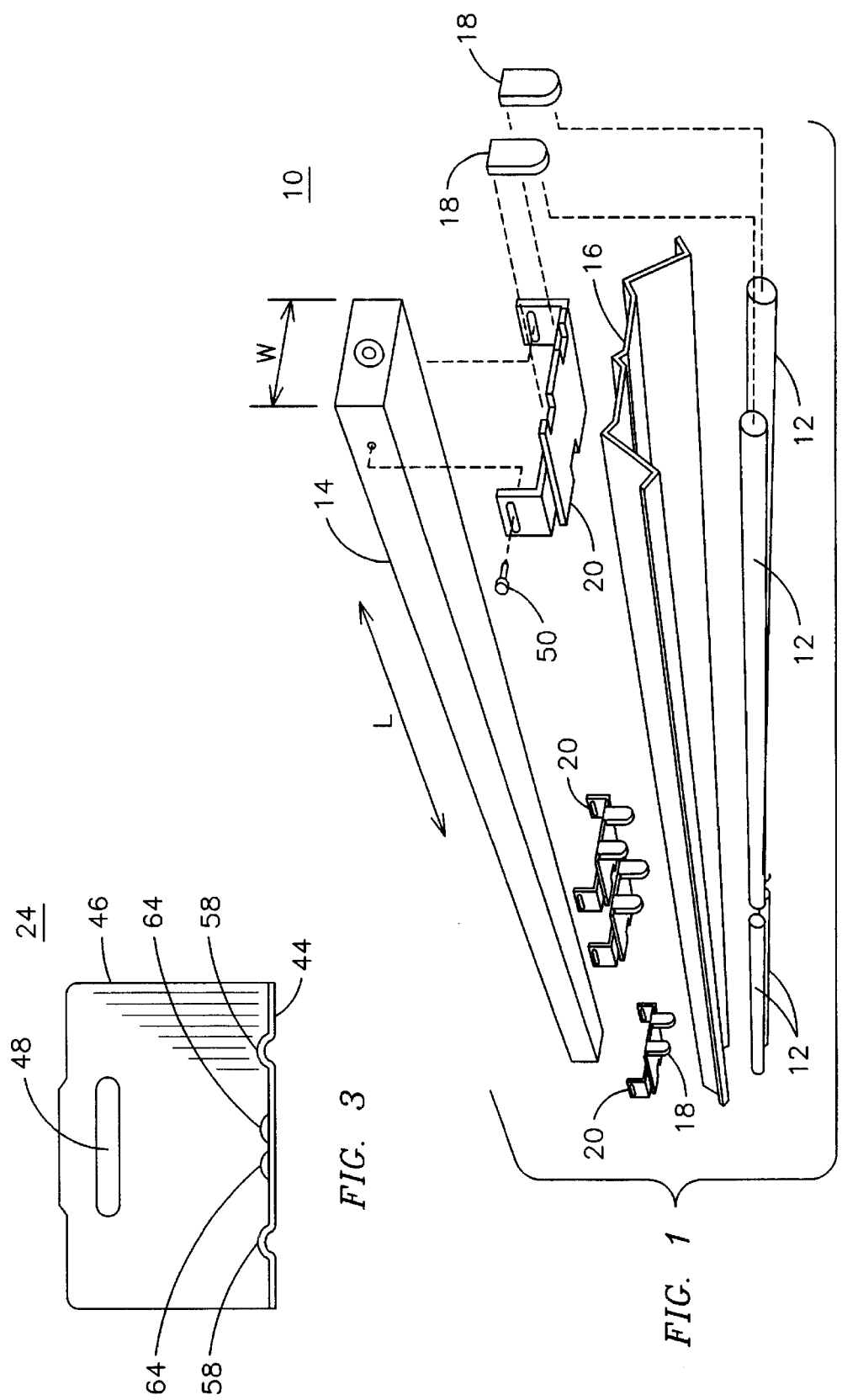
FIG. 1 is an exploded perspective view of a fluorescent light fixture including a reflector and energy efficient bulbs supported from the fixture body by an adjustable clip strip.

FIG. 1 illustrates an exploded view of a lighting fixture 10 after having been upgraded to include modem energy efficient bulbs 12. The fixture 10 includes a fixture body 14 that was originally installed as part of a lower-efficiency unit prior to the upgrade. The body 14 may be affixed to the ceiling of a lighted space in any manner known in the art, such as by fasteners, wire or chain hangers, etc. The fixture 10 also includes a reflector 16 and lamp holders 18 that are supported from the body 14 by four adjustable support members 20 called clip strips. The lighting fixture 10 also includes one or more ballast units and associated wiring, which are not shown in this illustration for purposes of clarity.

The width W of fixture body 14 may vary from about 4 inches to about 5.5 inches. Clip strip 20 is configured to be adjustable to accommodate any of these sizes, as more clearly illustrated in FIG. 2. Clip strip 20 includes a support body 22 and opposed angle brackets 24. The two angle brackets 24 are preferable identical to each other for ease of manufacturing and inventory control. Support body 22 includes one edge having recesses 26, 28, 30 formed to receive selectively one, two or three lamp holders 18, as well as a slotted center hole 32 for receiving a fastener (not shown) for securing the clip strip 20 to the fixture body 14.

Clip strip 20 also includes a plurality of generally "L" shaped channel members 34. Channel members 34 are preferably formed to be integral to support body 22 and connected thereto along a bend line 36, wherein the portion of the material of body 22 defined by generally U-shaped slot 38 is bent to have a first leg 40 disposed generally perpendicular to the plane of body 22, and a second leg 42 disposed generally parallel to the plane of body 22. The geometry of this portion of support body 22 may be seen most clearly in FIG. 2A.

Each angle bracket 24 has a generally "L" shaped geometry with a generally horizontal member 44 and a generally vertical member 46 preferably formed of a single piece of material having a generally right angle bend formed therein. The general shape of bracket 24 may be further appreciated by viewing FIGS. 2 and 3 together. Vertical member 46 includes a slotted hole 48 for receiving a tek screw 50 or other type of fastener for securing the clip strip 20 to the fixture body 14. The use of a slotted hole 48 provides for a measure of adjustment in the position of the clip strip 20 along length "L" of the fixture body 14 to facilitate the centering of the replacement lamps 12 with respect to the fixture body 14.

Two pairs of channel members 34 are disposed on support body 22 to define respective channels 52 for slidably receiving the horizontal member 44 of a respective angle bracket 24. Channels 52 are bounded by the top surface 54 of the center section of clip strip support body 22 and the bottom surface 56 of the channel members 34. The horizontal member 44 and channels 52 are sized for a generally loose slip fit. Generally linear protrusions 58 formed on the horizontal members 44 are mated to generally linear protrusions 60 formed on the support body 22 to facilitate the sliding of angle brackets 24 into the channels 52. By positioning the opposed pair of angle brackets 24 at various positions along channels 52, the clip strip 20 can be adjusted for mounting on a variety of widths W of fixture bodies 14.

Figure 2:
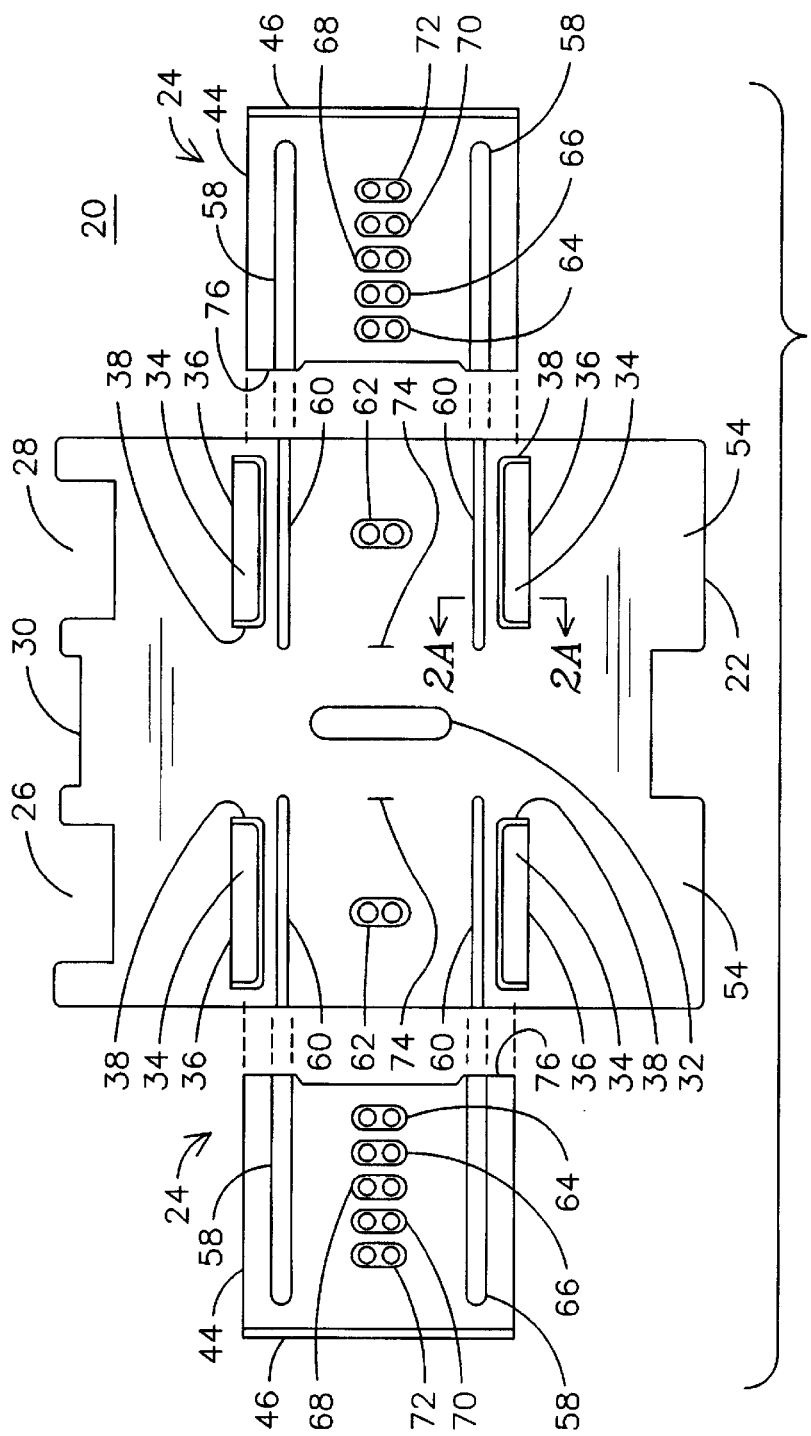
FIG. 2 is an exploded top view of the clip strip of FIG. 1.
Figure 2A:
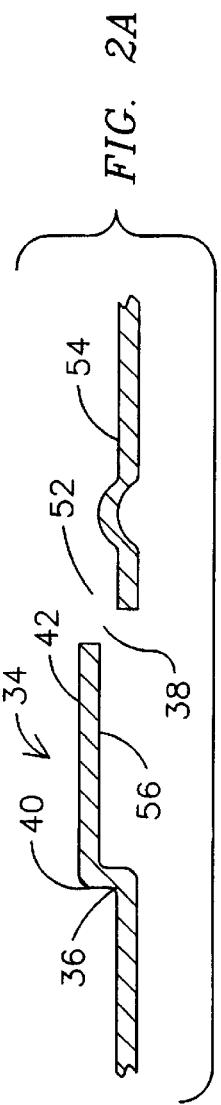
FIG. 2A is a side sectional view of a portion of the clip strip of FIG. 1 as viewed along Section 2A—2A of FIG. 2.

A locking mechanism may be provided to hold the angle brackets 24 at predetermined positions, such as positions for interfacing with fixture bodies 14 having widths W of 4 inches, 4.3 inches, 4.6 inches, 5 inches and 5.5 inches, for example. The locking mechanism illustrated in FIG. 2 is the detent 62 formed on support body 22 and mating detents 64, 66, 68, 70, 72 formed on angle bracket 24. Because these components are preferably formed of aluminum sheet metal, they will naturally bend to allow the mating detents to engage and disengage as the angle bracket 24 is slid within channel 52, yet will provide sufficient pawl/ratchet effect to hold the clip strip 20 at the selected width during the installation process. In one embodiment, the top surface 54 of support body 22 may be scribed or otherwise marked with indications 74 corresponding to the position of the interior edge 76 of horizontal member 44 when installed at one or more of the predetermined width locations.

Figure 4:
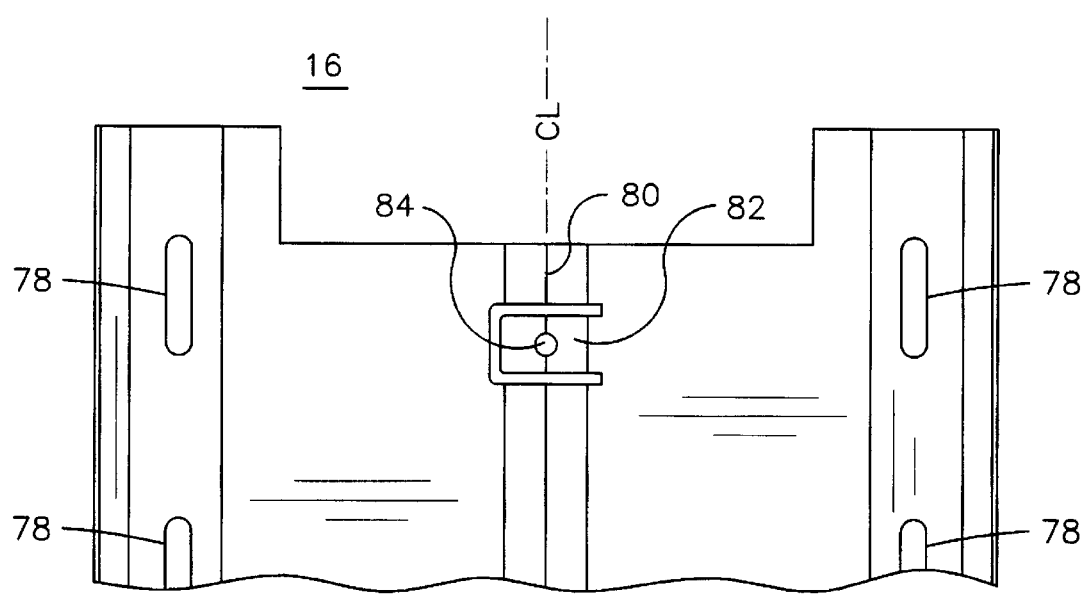
FIG. 4 is a partial bottom view the reflector of FIG. 1.
Figure 5:
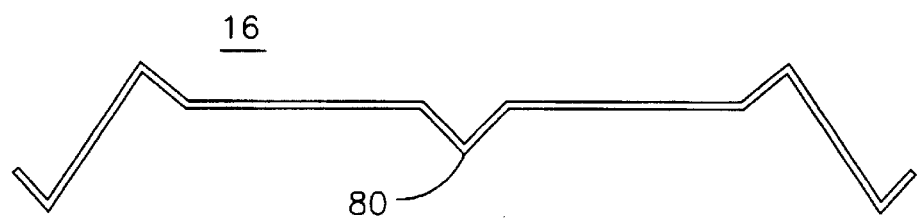
FIG. 5 is an end view of the reflector of FIG. 4 prior to installation with its mounting tab in the as-manufactured position.
Figure 6:
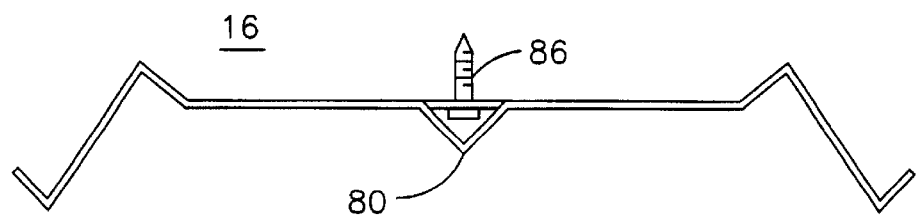
FIG. 6 is an end view of the reflector of FIG. 4 after installation and having its mounting tab in the as-installed position and receiving a fastener.

An end portion of reflector 16 may be seen in more detail in the bottom view of FIG. 4 and the end view of FIG. 5. Reflector 16 is preferable formed of a single piece of material, such as aluminum, having a reflective coating applied to a bottom side thereof. Holes 78 may be provided to allow a small amount of light to pass through the reflector 16 to illuminate areas above the fixture 10 and to facilitate convective cooling of bulbs 12. The reflector 16 is formed by known bending processes to have a generally concave shape for reflecting light from lamps 12 in a downward direction. A center ridge 80 may form part of the concave shape of the reflector 16, in particular for applications having two side-by-side bulbs 12. In order to provide adequate mechanical support for reflector 16 in accordance with UL Standard 1398, it is preferred to provide a pair of support locations along a length centerline CL. In order to accommodate both a support location and center ridge 80 along centerline CL, reflector 16 is provided with a mounting tab 82 defined by generally U-shaped opening 84 formed by a known stamping process. Opening 84 allows mounting tab 82 to be flattened to a generally horizontal position by simple manual bending of the sheet aluminum material. Hole 84 is provided for receiving a fastener 86 once mounting tab 82 is deformed from an as-manufactured position, as shown in FIG. 5, to an as-installed position as shown in FIG. 6. Because the connection between the reflector 16 and clip strip 20 my have to be made by an installer standing on a ladder, fastener 86 may preferably be a quarter-turn fastener or other connector which can be installed by hand without special tooling.

The process of upgrading an existing lighting fixture to a more energy efficient unit is facilitated by the use of the adjustable clip strip 20 and reflector 16 described above. Because clip strip 20 can be easily adjusted in the field to accommodate a range of fixture body widths W, it is not necessary to measure the exact width of the fixture bodies 14 prior to the installation activity. When planning for a lighting upgrade project, it is only necessary to count the fixtures, an activity that can be done without providing direct hand access to the fixtures, thereby eliminating the time and effort associated with climbing ladders or raising scaffolding simply to measure the fixture widths. Similarly, the manufacturing process is simplified because a single clip strip design can be used to accommodate all of the commonly used fixture body widths, from 4 inches to 5.5 inches. Both the clip strip 20 and reflector 16 are preferably formed of aluminum sheet material, for example from 1/32 inch thick and 1/64 inch thick sheet, respectively. The flexibility of the adjustable clip strip 20 eliminates the necessity to maintain separate inventories for each of the five commonly sized units. Furthermore, shipping costs are greatly reduced when compared to a fixed-width U-shaped clip strip, since the adjustable clip strip 20 consists of nearly flat support body 22 and identical L-shaped angle brackets 24, both of which can be stacked into piles with very little void space. Fixed-width U-shaped objects can not be so stacked, and will cause the shipped volume to contain a high percentage of void space, thereby adding to the cost of packaging.

Once an existing fluorescent light fixture has been disassembled to remove its old lamps and ballast, the energy efficient replacement bulbs 12, associated ballast, and reflector 16 can be installed. An adjustable clip strip 20 is provided having a range of widths sufficient to accommodate the widths of all fixture bodies 14 to be upgraded in a given facility. An appropriate number of lamp holders 18 are attached to the clip strip support body 22 and the two opposing angle brackets 24 are slid into channels 52 to the desired width mark 74 and locked into position by mating detents 62, 68. If the installer is not certain of the width W of a particular fixture body 14, the position of the angle brackets 24 can be adjusted in-situ to accommodate the body 14 during the installation process. Once the clip strip is attached to the fixture body 14 with fasteners 50, the reflector can be installed by inserting a quarter-turn fastener 86 through hole 82 in the reflector and slotted hole 32 in the adjustable clip strip 20. Mounting tab 82 may be flattened by the installer prior to the installation of the reflector 16 or as part of the installation process by simply pushing the quarter-turn fastener 86 against the bottom of the mounting tab 82 during the installation step. High efficiency replacement bulbs 12 may then be installed to complete the upgraded fixture 10. This process reduces the cost of manufacturing and shipping replacement fixture pieces, and it reduces the time and cost involved in the installation process.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A fluorescent lighting fixture comprising:
   a fixture body having a width dimension;
   a support member attached to the fixture body, the support member comprising at least one sliding member for adapting the support member to have a range of width dimensions, the range of width dimensions of the support member encompassing the width dimension of the fixture body;
   a fluorescent bulb supported from the support member;
   a support body member attached to the fixture body, the support body comprising a channel; and
   an angle bracket having a portion inserted into the channel and slidable therein.

2. The fixture of claim 1, further comprising a locking mechanism for releasably securing the angle bracket in any of a plurality of predetermined positions in the channel.

3. The fixture of claim 1, further comprising:
   at least one detent formed on the angle bracket;
   at least one detent formed on the support body member;
   wherein the angle bracket may be releasably secured in any one of a plurality of predetermined positions in the channel by aligning at least one detent on the angle bracket with at least one detent on the support body member.

4. The fixture of claim 3, further comprising:
   one detent formed on the support body member; and
   five detents formed on the angle bracket and positioned to releasably secure the angle bracket to have alternative widths of 4 inches, 4.3 inches, 4.6 inches, 5 inches and 5.5 inches.

5. The fixture of claim 1, wherein the channel is bounded by a surface of the support body and a pair of opposed generally L-shaped channel members formed to be integral with the support body.

6. The fixture of claim 1, further comprising:
   a generally linear protrusion formed on the support body member; and
   a generally linear protrusion formed on the portion of the angle bracket inserted into the channel and aligned with the generally linear protrusion formed on the support body member.

7. A fluorescent lighting fixture comprising:
   a fixture body having a width dimension;
   a support member attached to the fixture body, the support member comprising at least one sliding member for adapting the support member to have a range of width dimensions, the range of width dimensions of the support member encompassing the width dimension of the fixture body;
   a fluorescent bulb supported from the support member;
   a reflector having a generally concave shape and having a center ridge formed along a centerline thereof;
   a mounting tab formed at the centerline, the mounting tab defined by a generally U-shaped opening formed in the reflector, the mounting tab being flattened against the support member and having a hole formed therethrough;
   the reflector being attached to the support member by a fastener passing through the hole.

8. A support member for attaching a fluorescent bulb to a light fixture body, the support member comprising:
   a support body having a pair of channels formed thereon;
   a pair of angle brackets, each angle bracket having a horizontal member slidably disposed within a respective one of the channels and having a vertical member; and
   a width between the respective vertical members being adjustable by sliding a respective horizontal member within a respective channel to accommodate any of a plurality of light fixture body widths.

9. The support member of claim 8, further comprising a releasable locking mechanism for securing the pair of angle brackets at any of a plurality of positions.

10. The support member of claim 8, further comprising
    at least one detent formed on at least one of the angle brackets;
    at least one detent formed on the support body member; and
    wherein the at least one of the angle brackets may be releasably secured in any one of a plurality of predetermined positions in the respective channel by aligning at least one detent on the angle bracket with at least one detent on the support body member.

11. The support member of claim 10, wherein the detents are formed to releasably secure the angle brackets so that the width between the respective vertical members may be any of 4 inches, 4.3 inches, 4.6 inches, 5 inches and 5.5 inches.

12. The support member of claim 8, further comprising an edge pattern adapted for receiving selectively one, two or three lamp holders.

13. The support member of claim 8, wherein each channel is bounded by a surface of the support body and a pair of opposed generally L-shaped channel members formed to be integral with the support body.

14. A method of upgrading a fluorescent light fixture, the method comprising the steps of:
    providing an existing fixture body having a width;

providing a support member that is adjustable to interface with fixture bodies having a plurality of widths;

adjusting the support member to interface with the width of the existing fixture body;

attaching the support member to the fixture body;

attaching a lamp holder to the support member;

connecting a replacement bulb to the lamp holder;

providing a reflector having a center ridge and a generally concave shape;

forming a mounting tab along the center ridge by cutting a generally U-shaped opening in the reflector;

flattening the mounting tab; and attaching the mounting tab to the support member.

15. A method of upgrading a fluorescent light fixture, the method comprising the steps of:

providing an existing fixture body having a width;

providing a support member that is adjustable to interface with fixture bodies having a plurality of widths;

adjusting the support member to interface with the width of the existing fixture body;

attaching the support member to the fixture body;

attaching a lamp holder to the support member;

connecting a replacement bulb to the lamp holder;

providing a generally planar support body having a pair of channels formed thereon;

providing two generally L-shaped angle brackets;

assembling the support member at the location of the existing fixture body by inserting each angle bracket into a respective channel to a position corresponding to the width of the existing fixture body.

16. The method of claim 15, further comprising the step of providing a locking mechanism to releasably secure the angle brackets in their respective positions.

17. The method of claim 16, further comprising the step of providing mating detents on the support body and on each respective angle bracket to releasably secure the angle brackets in their respective positions.

* * * * *